US007942735B2

(12) United States Patent
Meyer et al.

(10) Patent No.: US 7,942,735 B2
(45) Date of Patent: May 17, 2011

(54) METHODS AND SYSTEMS FOR CONDUCTING LIVE POOL AND COMPETITIVE WAGERING ACTIVITIES

(75) Inventors: Mark G. Meyer, New Freedom, PA (US); Joseph J. Tracy, Westminster, MD (US)

(73) Assignee: United Tote Company, Glen Rock, PA (US)

( * ) Notice: Subject to any disclaimer, the term of this patent is extended or adjusted under 35 U.S.C. 154(b) by 892 days.

(21) Appl. No.: 11/079,923

(22) Filed: Mar. 14, 2005

(65) Prior Publication Data
US 2006/0205483 A1 Sep. 14, 2006

(51) Int. Cl.
*G06F 17/00* (2006.01)
*G06F 19/00* (2006.01)

(52) U.S. Cl. ............... 463/25; 463/6; 463/26; 463/28; 463/42

(58) Field of Classification Search ............... 463/6, 25, 463/26, 28, 40–42
See application file for complete search history.

(56) References Cited

U.S. PATENT DOCUMENTS

| | | | | |
|---|---|---|---|---|
| 4,775,937 A | * | 10/1988 | Bell | 463/28 |
| 5,159,549 A | * | 10/1992 | Hallman et al. | 463/26 |
| 5,265,874 A | | 11/1993 | Dickinson et al. | |
| 5,476,259 A | * | 12/1995 | Weingardt | 463/28 |
| 5,573,244 A | * | 11/1996 | Mindes | 463/26 |
| 5,755,621 A | * | 5/1998 | Marks et al. | 463/42 |
| RE35,864 E | * | 7/1998 | Weingardt | 463/28 |
| 5,842,921 A | * | 12/1998 | Mindes et al. | 463/16 |
| 5,902,983 A | | 5/1999 | Crevelt et al. | |
| 5,957,775 A | * | 9/1999 | Cherry | 463/16 |
| 5,984,779 A | | 11/1999 | Bridgeman et al. | |
| 6,033,308 A | * | 3/2000 | Orford et al. | 463/28 |
| 6,093,100 A | * | 7/2000 | Singer et al. | 463/13 |
| 6,206,782 B1 | * | 3/2001 | Walker et al. | 463/25 |
| 6,210,275 B1 | * | 4/2001 | Olsen | 463/16 |
| 6,287,202 B1 | * | 9/2001 | Pascal et al. | 463/42 |
| 6,347,738 B1 | | 2/2002 | Crevelt et al. | |
| 6,652,378 B2 | * | 11/2003 | Cannon et al. | 463/20 |
| 6,666,769 B2 | * | 12/2003 | Stronach | 463/40 |
| 6,908,390 B2 | * | 6/2005 | Nguyen et al. | 463/42 |
| 2002/0028706 A1 | * | 3/2002 | Barnard et al. | 463/26 |

(Continued)

OTHER PUBLICATIONS

"2002 Bradley Teletheater Handicapping Contest Rules," Autotote Racing News, 2002, 3 pages.

(Continued)

*Primary Examiner* — Melba Bumgarner
*Assistant Examiner* — Milap Shah
(74) *Attorney, Agent, or Firm* — TraskBritt

(57) ABSTRACT

Methods and systems for conducting wagers, such as parimutuel wagers. In one exemplary embodiment a series of events, such as horse races, dog races, etc., is identified for which a plurality of bettors may each place at least one wager, and a wagering activity thereon is structured as a contest. Bettors may each be provided with a "play money" bankroll for use in wagering, and play against one another competitively to achieve one or more winning outcomes for the contest as defined by the operator. Alternatively, bettors may have their conventional, live wagers entered into the contest. The prize pool for the contest, which may be multi-tiered, is fixed based on the number of participants and allocated to winners independent of the live wager prize pool, thus not affecting odds for the live wager. The contest wagering activity may be run in parallel with live wagering, and utilizing the same wagering system for administration of both. Wagering systems and a wagering network are also disclosed.

42 Claims, 4 Drawing Sheets

U.S. PATENT DOCUMENTS

| | | | | |
|---|---|---|---|---|
| 2002/0034981 A1* | 3/2002 | Hisada | | 463/42 |
| 2002/0065566 A1* | 5/2002 | Aronson et al. | | 700/91 |
| 2002/0077712 A1* | 6/2002 | Safaei et al. | | 700/93 |
| 2002/0142816 A1* | 10/2002 | Stronach | | 463/6 |
| 2003/0073494 A1* | 4/2003 | Kalpakian et al. | | 463/42 |
| 2003/0083118 A1 | 5/2003 | Nelson et al. | | |
| 2003/0186744 A1 | 10/2003 | Bradell | | |
| 2004/0048656 A1* | 3/2004 | Krynicky | | 463/25 |
| 2004/0198483 A1* | 10/2004 | Amaitis et al. | | 463/16 |
| 2004/0229671 A1* | 11/2004 | Stronach et al. | | 463/6 |
| 2004/0235542 A1* | 11/2004 | Stronach et al. | | 463/6 |
| 2004/0248652 A1 | 12/2004 | Massey et al. | | |
| 2005/0049731 A1* | 3/2005 | Dell | | 700/91 |
| 2005/0086143 A1* | 4/2005 | Vlazny et al. | | 705/35 |
| 2005/0124408 A1 | 6/2005 | Vlazny et al. | | |
| 2005/0124410 A1* | 6/2005 | Vlazny et al. | | 463/28 |
| 2005/0176499 A1* | 8/2005 | Stronach | | 463/27 |
| 2005/0245305 A1* | 11/2005 | Asher et al. | | 463/16 |
| 2006/0121981 A1 | 6/2006 | Pfennighausen et al. | | |
| 2006/0252520 A1* | 11/2006 | Platis | | 463/28 |
| 2008/0076544 A1* | 3/2008 | Mindes et al. | | 463/28 |
| 2008/0207310 A1* | 8/2008 | Mindes | | 463/25 |

OTHER PUBLICATIONS

"2003 Aqueduct Fall Handicapping Challenge," New York Racing Association, Sep. 2003, 3 pages.

"The 2003 Big M Thoroughbred Handicapping Challenge," Meadowlands Racetrack, Nov. 2003, 2 pages.

"$50,000 Championship Meet, Big M Harness Handicapping Challenge," Meadowlands Racetrack, Jul. 2004, 2 pages.

Angelo, John, "Improving Your Tournament Play," American Turf Monthly, 2004, 4 pages.

"Bet the Races," Arlington Park, Bet the Races, Racing News, Aug. 2004, 3 pages.

The Colonial Downs Handicapping Classic Official Rules, Colonial Downs, 2004 3 pages.

"Columnist Ralph Siraco: Best handicappers compete in Orleans tournament," Las Vegas SUN, Mar. 2004, 3 pages.

"DRF/NTRA Qualifying-Contest Index," Bally Race and Sports, 2004, 7 pages.

"Glossary," I Play Tournaments, 2004, 2 pages.

"Handicapping Challenge Official Rules," National Orange Show, 2003, 2 pages.

Michaels, Noel, Handicapping contest a hit, Daily Racing Form, 2003, 1 page.

"Penn National Summer Handicapping Challenge Set for Saturday Night, Jul. 24," Penn National Race Course, 2004, 2 pages.

"Suffolk Downs News and Notes," Suffolk Downs, Dec. 2004, 13 pages.

"Today's Promotions," Sign Up Bonus—WinTicket.com, 2004, 4 pages.

"WatchandWager.com, Wednesday Tournaments," Watch and Wager, 2004, 6 pages.

"World Series of Handicapping," Penn National Race Course, 2004, 4 pages.

\* cited by examiner

METHODS AND SYSTEMS FOR CONDUCTING LIVE POOL AND COMPETITIVE WAGERING ACTIVITIES

BACKGROUND OF THE INVENTION

1. Field of the Invention:

The present invention generally relates to wagering and, more particularly, to methods of conducting wagering activities including, for example, methods and systems for accepting and pricing wagers and establishing prize pools for wagers conducted competitively as a contest and, optionally, in parallel with conventional wagering activities, such as pari-mutuel wagering.

2. State of the Art:

Wagering relates to the placing of wagers or bets by a plurality of individuals on the outcome of an event, wherein bettors who place "winning" wagers typically share a betting pool minus a percentage taken out for the management or administration of the wagering activity by the "house," or organization conducting the game. Traditional casino gaming, as well as lotteries and pari-mutuel wagering, are typical examples.

In pari-mutuel wagering, often associated with animal racing (e.g., horses or dogs) individuals may place wagers on one or more aspects of the outcome of at least one race. These aspects may include, for example, which of the participants (also referred to herein as runners) will win, place (second) and show (third) in the race, the order in which a plurality of runners will finish the race (e.g., exacta—ordered prediction of first and second place; trifecta—ordered prediction of first, second and third place; superfecta—ordered prediction of first through fourth place; etc.), or a runner finishing within a specified range of positions (e.g., a "show" wager for a given runner to finish in either first, second or third place; or a "quinella" wager for predicting the first and second place finishers regardless of order).

For those individuals who have placed a winning wager such that their prediction matches an actual event outcome, their payout is related, in part, to the probability of occurrence of the wager (e.g., a show wager vs. a trifecta wager), and, in part, by the size of the pool as defined by the total amount of wagers placed for a given event and, in part, the specific wagers made by other bettors. Thus, for example, if a defined prize pool is to be paid out to those wagers that selected runner X as the winner and, for example, 20 individual wagers were placed on runner X to win, the prize pool will be divided among those 20 bettors in proportion to the amount each of the 20 individual bettors wagered on such an outcome.

Pari-mutuel wagering is preferred by some individuals because a wager may be "handicapped" in the sense that a bettor may study different facets of an event to make an educated prediction of the outcome of the event prior to placing their wager. For example, in a horse race, a bettor may review the past performances of the horses in that race, the training histories of the horses, the breeding histories of the horses, which jockeys will be participating and other related information. Consideration of such information enables a bettor to make a more educated prediction regarding the outcome of a race or other event.

Many individuals prefer other types of wagering activities, such as slot machines, purchasing of lottery tickets or other conventional wagering activities offered at a casino or a lottery facility, because they find the act of handicapping a pari-mutuel wager to be complex, difficult and time consuming. Furthermore, many individuals find pari-mutuel wagering tedious, slow and time consuming since often there is a significant period of time between races at racing facilities and several minutes may pass between the time an individual places a wager on a race and the outcome of the wager is made known. Such extended time lags are in contrast to casino wagering, wherein multiple wagers may be placed in a game substantially concurrently or in quick succession and the outcome of each wager made known in rapid succession, such as with slot machines, roulette, keno or craps.

Regardless of the type of wagering activity, the betting event itself (e.g., the running of a race, the spinning of slot machine reels, the roll of the dice) is generally of short duration and, since the laws of gaming dictate that players lose more often than they win, it is easy for players to deplete their wagering funds more quickly than is desirable. Extended losing experiences and the resulting premature fund depletion produce a number of negative consequences, including discouragement to the point of abandoning the wagering activity in favor of other pursuits (with a resulting decrease in gaming revenue) or the compensatory spontaneous increase in wagering activity or wager amounts attempting to win back losses, which can create financial hardship, marital discord and other social problems.

Most wagering activity is solitary, and it is difficult for players to evaluate their performance relative to the performance of others. A player's comparative perception of winning or losing is based upon his or her personal experience vis-à-vis the experiences of players immediately adjacent to that player. For example, slot machine players are generally unaware of other players' experiences outside their immediate area. Similarly, blackjack, craps and roulette players are aware only of the performances of players sharing the same table. A few games, such as poker, feature a competitive element whereby winners directly compete against each other and win at the expense of their fellow players. This competitive element provides a level of personal involvement and a sense of drama that most other conventional gaming activities lack. While there exists some social aspect to gaming, it is generally manifested in discussing techniques (e.g., which machines are "hot," how to handicap, etc.), boasting about winning experiences or commiserating about losing experiences. The isolated nature of gaming and the brevity of gaming events discourage interaction and generally do not foster a sense of competition.

In contrast, contest based games, such as fantasy football or baseball, emphasize—indeed have the main focus of—competition against other human competitors and encourage the individual to evaluate his performance against the performance of others. Generally played on the Internet, fantasy games currently enjoy unprecedented levels of popularity despite the absence of significant cash prizes. Buzztime Entertainment, Inc., a subsidiary of NTN Communications, Inc., distributes sports and trivia games to a variety of interactive platforms in thousands of sports bars and premier casual restaurants in the United States and Canada. Like most Internet fantasy leagues, these entertaining skill-based games do not offer significant cash prizes. Instead, their popularity results from the fact that they are designed to enable direct competition between the contestants, provide an extended entertainment experience (often lasting hours), they are free of charge, they are located in social venues and, perhaps most significantly, they are interactive, i.e., via a sophisticated communications network, players in one locale can compete and compare their performances to the performances of other individuals and groups throughout the United States and Canada.

There have also been various attempts by pari-mutuel venues to attract individuals who are inclined to participate in wagering activities that offer some form of direct competition with other bettors. For example, pari-mutuel venues have periodically offered so-called handicapping tournaments wherein a bettor decides to enter the contest and pays an entry fee by which a specified number of participants may compete with one another for a preselected distribution of the cumulative sum of the entry fees, prizes, or both. In comparison to lottery jackpots or prizes, these handicapping tournaments typically offer much smaller payouts or rewards, and there must be an affirmative decision by the patron to enter the contest.

Handicapping tournament schemes as described above have been limited in their appeal to bettors because they offer very modest rewards and prizes. This is a material drawback because a significant factor in attracting patron interest to the point of incentivizing a patron to pay the entry fee is the size of the probable jackpot that a patron can expect to win. Thus, it would be desirable from the pari-mutuel venue's standpoint to provide relatively large jackpots and to provide relative predictability for the patron in providing such jackpots to attract a large and regular group of patrons. However, in conventional pari-mutuel wagering activities, where odds are affected by the betting proclivities of the patrons, the reward for winning is inversely related to the ability of the bettor population to predict the outcome of a given event or series of events. Because the predictability of outcomes may vary considerably from one event (e.g., race) to another, a pari-mutuel venue has little control over the awards offered in association with such events. Furthermore, in conventional pari-mutuel wagering, there is no degree of certainty whatsoever, other than that provided by betting more slowly or in smaller amounts, as to the amount of time that a given amount of money that is wagered will provide betting opportunities or entertainment.

In view of the shortcomings in the art and needs attendant thereto, the inventors herein have recognized that it would be advantageous to provide a method and system for wagering that is attractive to a wide variety of patrons, which provides an easily perceptible potential for increased jackpots and provides greater predictability in providing betting opportunities or entertainment for an extended period of time. It would also be advantageous to provide a method and system for wagering such that a given bettor is enabled to actively compete against other bettors in a prize environment structured differently than that associated with conventional pari-mutuel wagering and, optionally, in association with conventional pari-mutuel wagering.

Even more specifically, the inventors herein have recognized that it would be desirable to provide a wagering activity in which a small entry fee makes players eligible for significant cash or merchandise prizes, or both and that provides an extended gaming experience to provide great value for the entertainment dollar (such economy essentially enabling participants to lose money at a slower rate). It would also be desirable to provide a wagering activity that would support individual competition, as well as competition among teams or groups formed on an ad hoc basis in betting locations, and that would provide real-time competition among participants. It would further be desirable to provide a wagering activity that accurately simulates (does not corrupt the integrity of) the underlying (or base) game, in which players can track their own performances relative to the performances of competing players or teams and in which winners are defined and determined by variable criteria that provide flexibility, variety and entertainment. Other desirable aspects for a wagering activity would be the capability to link players from around the country or even around the world in a common direct competition for cash or merchandise prizes.

To enhance entertainment value in a responsible fashion, the inventors herein have recognized that it would be desirable to provide a wagering activity that provides participants an element of fantasy by providing play money or "fantasy dollars" from which to place wagers. By using fantasy dollars, participants will be able to bet more, bet more often and place bets they would not ordinarily place when playing with their own money. Concurrently, the risk of overspending will be significantly reduced and the psychological difficulty of losing wagers will be diminished. Therefore, such a wagering activity would desirably reduce the likelihood of problem gaming by controlling or limiting player expenditures while allowing players to authentically play the featured game (horseracing, slots, blackjack, etc.). One desirable implementation of a wagering activity would permit the prize pool (or prize fund) to be allocated on a pari-mutuel basis as a percentage of sales (wagers) but also possess the flexibility necessary to permit easy adjustment or alteration of specific prizes in order to provide variety and interest to different demographic groups.

Another desirable implementation of a wagering activity, as recognized by the inventors herein, would provide a wagering activity that would attract occasional, infrequent, lapsed and even non-players of the featured, competitive game to attract new players to the venues hosting the featured contest game.

It would also be desirable, as recognized by the inventors, to provide a wagering activity that can be configured to be run as tournaments among individuals or teams, that can be distributed through a variety of wagering venues including race tracks, off-track betting facilities, retail establishments (where legal), casinos, lotteries and on the Internet and that would provide automatic and immediate performance feedback (individual and team performance, leader boards or other indicia of standings, contest time remaining, account balances, etc.) to participants via text messaging, cellular telephones, personal digital assistants (PDAs), interactive television, email, etc. Such an activity would desirably be enabled to be run in a specific environment at a specific location on a stand-alone (or closed) system or be electronically linked to include play in a plurality of environments or at a plurality of locations.

Such a wagering activity, as contemplated by the inventors, might also be a parameter-driven wagering game that permits the track or other operator to vary the length of the competition and the awarding of prizes, e.g., hourly winners, daily winners, weekly winners, etc. The criteria of winning might also desirably be variable, adjustable and easily modified. For example, winning could be defined as the player placing the most bets (or most plays) in a specified period, the player with the most wins in a specified period, the player with the highest winning percentage, the player winning the most "play money" in a specified time, etc. Alternatively or in addition, a wagering activity might desirably provide the ability to add attractive marketing features e.g., free or player-paid bonus features such as doubling or tripling winnings during specified hours; raffle-based drawings among previous winners (or all entrants or the population of non-winners); bonus awards for players attaining defined thresholds of winnings, wagers, winning percentages, etc.

To enhance implementation of such a wagering activity, it would desirably feature an architecture to permit parallel processing with other, related wagering activities. For example, when placing conventional bets into a live pool at a racetrack, those bets might automatically and simultaneously be entered into the contest pool for those players who elected to participate in the contest wager.

BRIEF SUMMARY OF THE INVENTION

In accordance with one aspect of the invention, a method of conducting a wagering activity is provided, which addresses the foregoing needs and provides additional advantages in comparison to the state of the art.

Particularly, the present invention encompasses methods of conducting directly competitive wagering activity, also termed "contest wagering" activity herein for the sake of convenience. A plurality of events upon which a plurality of bettors may each place at least one wager may be provided. Further, each bettor of the plurality of bettors may be enabled to engage in a competitive wagering activity in relation to the plurality of events and the cumulative, competitive wagering activity of each of the plurality of bettors for all of the plurality of events may be evaluated in determining one or more winners. At the same time, each of the plurality of bettors may, optionally, be enabled to engage in a live pool wagering activity based upon the outcome of one or a combination of the same plurality of events. In other words, the present invention may be structured to enable a competitive betting contest to be operated concurrently and in parallel with conventional live pool wager activity.

A further aspect of the present invention comprises a method of wagering. For example, a participation or entry fee may be paid for a competitive wagering activity including a plurality of bettors in which an outcome thereof is determined with respect to a cumulative evaluation of wagering results related to a specified plurality of events. Also, an opportunity may be presented to place one or more wagers upon at least one of the plurality of events in a live wagering pool.

In one specific, exemplary embodiment of a method of the present invention, an entry fee is required, upon payment of which by a bettor a predetermined sum of fantasy dollars are awarded for use by the bettor in wagering on a selected plurality of events. At the conclusion of the events, a winner or winners are determined by preselected criteria, such as (by way of example only) at least one of highest total winnings in fantasy dollars, highest ending balance in fantasy dollars, highest winning percentage. The method may be structured to encourage bettors to wager their fantasy dollar balances throughout the contest rather than hold early winnings as the contest progresses. Contemplated implementations of this embodiment of the invention are through the Internet, as well as through off-track betting (OTB) venues.

In another specific, exemplary embodiment of a method of the present invention, no entry fee is required but a bettor using an identification instrument, such as a track-issued, electronically readable player tracking or wagering account card is automatically entered into a contest wagering activity. The bettor's actual, real money wagers and winnings are tracked throughout the course of a selected period such as, for example, a given day at a racing venue. The winner or winners of the contest wagering activity may be determined formulaically, for example, based on the greatest return on dollars wagered. Contest prizes over and above the wager winnings may be funded by the game operator or other sponsor and provided as a bonus to those using the venue's player tracking or wagering account card. A contemplated implementation of this embodiment would be at a racing venue, such as a horse or dog track.

In yet another specific, exemplary embodiment of a method of the present invention similar to the previous embodiment, an entry fee is required and bettor participation is voluntary. In this embodiment, the prize pool is self-funded, from the entry fees paid by the bettors. Again, the winners may be determined formulaically based, for example, upon the greatest return on real money wagered.

In a further specific, exemplary embodiment of a method of the present invention, a contest wagering activity may be implemented in a form requiring no entry fee and awarding no tangible prizes, for amusement purposes only.

A wagering system or network may be utilized for conducting a competitive wagering activity according to the present invention. The wagering system includes a computer having at least one processor and at least one memory device. An input device is configured to receive at least one selection of from each of a plurality of bettors regarding at least one predicted aspect of an outcome of an event. A network may include a plurality of wagering systems operably coupled with each other. At least one of the wagering systems includes a computer having at least one processor and at least one memory device. An input device is configured to receive at least one selection from each of a plurality of bettors regarding at least one predicted aspect of an outcome of an event. The wagering system, and a network incorporating a plurality of wagering systems, may be desirably configured for simultaneous operation and administration of a competitive wagering activity of the present invention and conventional, live pool wagering activity.

Features from any of the above-mentioned embodiments may be used in combination with one another in accordance with the present invention. In addition, other features and advantages of the present invention will become apparent to those of ordinary skill in the art through consideration of the ensuing description, the accompanying drawings, and the appended claims.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
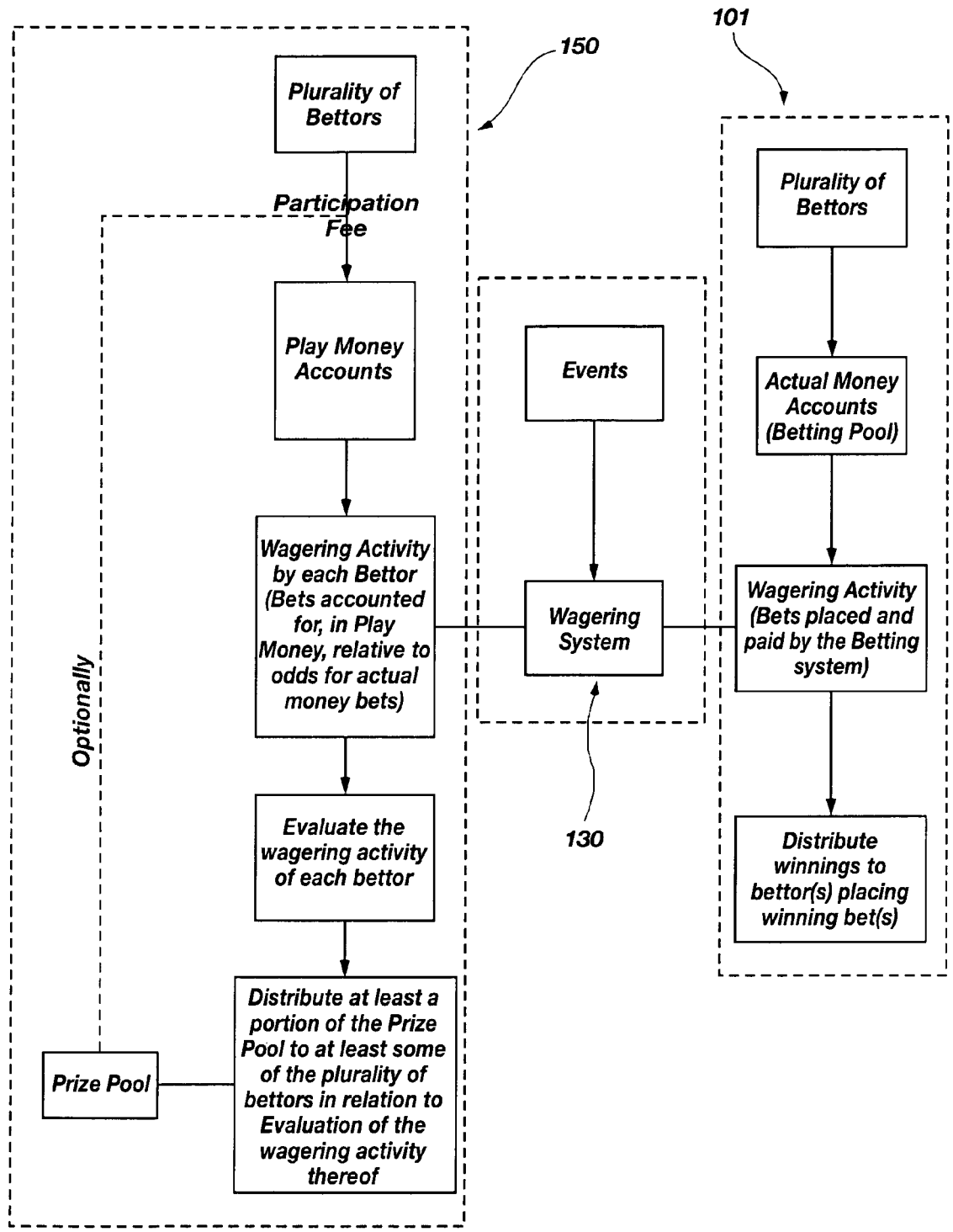
FIG. 1 is a schematic block diagram illustrating a method for conducting wagering activity in accordance with one embodiment of the present invention.

The present invention relates to a method of wagering, for example, pari-mutuel wagering, wherein bettors compete with one another for a selected time period and during a selected plurality of events in a contest wagering activity. More specifically, a plurality of bettors may select a given plurality of events for competing with other bettors and may submit a participation or entry fee for participating in the competitive wagering activity.

In one embodiment, a time period may be selected that encompasses a plurality of events during which bettors may compete with one another. For example, an administrator, such as a pari-mutuel betting venue may select a time period (e.g., which may correspond to a selected plurality of events) during which bettors may compete with one another. Alternatively, bettors (through an appropriate mechanism such as by voting) may select a time period for competing with one another. In an exemplary embodiment of the present invention, a plurality of events, such as a plurality of dog or horse races or other competitions, such as, for example, football or baseball games, soccer matches or jai alai matches (all such activities being hereinafter referred to as "race" merely for purposes of clarity and convenience), may be conducted. Such races may occur over a given time frame or wagering period (e.g., minutes, hours, days, weeks, months, an entire sport season, etc.) and may occur at one or a plurality of tracks, stadiums, arenas or other venues wherein races may be conventionally monitored from one venue or other selected location by way of an appropriate network or broadcast system, as will be appreciated by those of ordinary skill in the art. A contest wagering activity of the present invention may include, for example, wagering upon a plurality of horse races. Such races might comprise all of the races at a particular venue or group of venues, or a defined subset of races from one or more venues. The ability might be offered to bettors to wager on any pools offered by the venue or venues, or the contest may be restricted to select pools as determined by the wagering activity administrator.

Prior to the beginning of the selected contest time period, which may also be termed a wagering period (such as 10 a.m. to 10 p.m. on a given day), a participation or entry fee may be required from each of the plurality of bettors. The participation fees collected from the plurality of bettors may be pooled for distribution of at least a portion thereof to selected bettors of the plurality of bettors according to the respective favorability of the outcomes of their wagering activities during the contest period, as described in greater detail below. In a second implementation, to be used as a promotion to stimulate the use of player tracking or account wagering cards as known in the art, there may be no entry "fee," and all bettors using such a player tracking or account-wagering card may be automatically entered in the wagering contest. In this implementation, prizes may be awarded according to the respective favorability of the outcomes of their wagering activities during the contest period, and the costs associated with any prizes or funds awarded would be incurred as a marketing expense by the racing venue and/or third party promotional partners. In a third implementation, all bettors using a player tracking or account wagering card may optionally elect to pay a participation fee to enter a contest. Participants in this implementation, then, would consist of a sub-group of all player tracking or account wagering card users and the participation fees collected from this plurality of bettors may be pooled for distribution of at least a portion thereof to selected bettors of the plurality of bettors according to the respective favorability of the outcomes of their wagering activities during the specified time frame.

For all three exemplary implementations, contest wagering may be effected by providing participants an opportunity to participate in wagering for the selected plurality of events. For example, the bettor may, for example, select runner eight (8) to finish first, runner two (2) to finish second, and runner three (3) to finish third for one event of the plurality of events. It is noted that other types of wagers as may be desired (e.g., perfecta, superfecta, quinella, etc.) may be also be implemented as authorized contest wagers for one or more of the plurality of events with such a method. As noted above, depending on the number of events and occurrence thereof, a wagering administrator may vary the temporal extent or length of the competition and the conditions for awarding of prizes, if desired.

Turning to the operation of a contest wagering activity according to the present invention, outcomes of each bet (i.e., wagering activity) of each bettor may be tracked or monitored and memorialized, as in computer memory, for each of the plurality of bettors for each of the plurality of events conducted during the wagering period. After the wagering period has expired and the plurality of events has concluded, an evaluation of a cumulative wagering performance of each of the bettors may be performed. Particularly, an evaluation of the cumulative favorable outcomes of wagering actions for each of the plurality of bettors may be determined. Further, at least some of the bettors may be selectively rewarded (e.g., by a payout) according to the relative magnitude of cumulative favorable outcomes of the wagering activities associated therewith. For instance, a given number of bettors (e.g., three bettors) having the most favorable cumulative wagering outcomes, respectively may be rewarded with selected percentages (the same or different) of the participation fees initially collected from the plurality of bettors or with other prizes or rewards as deemed appropriate by a pari-mutuel betting venue.

In another aspect of the present invention, optionally, upon collecting a participation fee from a bettor, an imaginary betting bankroll comprising "fantasy dollars," "play" money, credits, or other betting resource pool may be provided to each bettor for use in placing bets during the selected wagering period time frame and upon the events encompassed therein. More particularly, the betting resource pool may exceed (in imaginary value) the actual value of the participation fee. For example, if a participation fee is $10 for each bettor, each bettor may be given a play money betting bankroll or resource pool of $10,000. Of course, for fairness, each play money betting resource pool allocated to a bettor may be identical in (imaginary) magnitude or value for each participation fee submitted by a bettor wishing to compete in the competitive wagering activity. One bettor may submit a plurality of participation fees so as to obtain separate play money bankrolls; however, each play money bankroll will be utilized in a separate contest account to wager on the plurality of events.

Such a contest wagering activity configuration may provide participants an element of fantasy and mental stimulation above and beyond that of conventional wagering by providing play money dollars from which to place wagers (i.e., enables participants to bet more, bet more often and place bets they would not ordinarily place when playing with actual money). Further, losses of large sums of play money may be more readily psychologically accepted in comparison to losses of actual money bets; therefore, such wagering activity may be relatively entertaining and enjoyable for participants, even if, ultimately, such wagering activity results in a loss of entrant participation fees (actual money). Thus, providing a play money betting bankroll that exceeds (in imaginary or comparable value) the actual value of the participation fee may prolong the wagering activity and facilitate increased excitement and enjoyment while simultaneously reducing the stress commonly associated with losing real money for a bettor participating in wagering activities that are conducted therewith.

In another aspect of the present invention, contest wagering activities conducted with the play money bankroll may be processed within a wagering framework, system or network for conducting conventional wagering on live events, such as pari-mutuel wagering, but separate in terms of accounting for wagers and outcomes from those associated with actual money betting. For example, in a pari-mutuel betting environment, bettors may select a type of bet and an amount wagered on any race or, alternatively, the track or game operator may elect to limit the types or amounts of a wager as desired. Each amount so wagered will be deducted from the bettors' play money accounts. Further, the amount of "play money" wagered on a particular event will not intermingle with the actual or real wagering pool for that race. Therefore, the amount of play money wagered upon a race will not affect the odds or payout for actual, or live money, wagering. Further, as may be appreciated, play money wagers may be processed and tracked simultaneously and in parallel with a live or conventional wagering activity. Such a wagering activity may provide increased wagering choices for a bettor as well as enhanced entertainment value.

For example, FIG. 1 shows a schematic block diagram representation of a general method of wagering according to the present invention. Particularly, FIG. 1 shows a conventional wagering method 101, wherein a plurality of bettors place "real" money bets via a betting system based upon one or more events. The wagering system 130 enables wagering activities to occur based, at least in part, upon potential outcomes of the events. As discussed herein, events may comprise any outcome-determinative contest or competition, race, game (of chance or skill), or any other suitable event wherein an outcome is at least somewhat unpredictable.

In conventional pari-mutuel wagering activities, as exemplified by conventional wagering method 101, the payout or distribution of winnings may be inversely related to the ability of the bettor population to predict the outcome of a given event or series of events. In practice, conventionally, odds (i.e., payout odds) for a given outcome of a race vary in relation to the cumulative amount of wagering on the outcome. Also, because the predictability (i.e., probability of occurrence) of events varies considerably from one event to another, a pari-mutuel venue has little control over the jackpots offered in association with such events. In contrast, the competitive or contest wagering activity of the present invention does not influence the odds or payout of the competitive or contest wagering activity or of an actual money, or live, wagering pool associated with wagering on the same events.

For instance, in a method of wagering according to the present invention, as exemplified by wagering method 150 depicted in FIG. 1, a plurality of play money accounts may be established, one for each participation fee that is paid to the wagering administrator. Then, the play money may be used within the wagering system 130 and may be accumulated or deducted from each of the play money accounts in accordance with payouts and deductions as would be experienced by actual "real" wagers placed within the wagering system 130. Explaining further, when wagers with play money are winning wagers, bettors' "play money" accounts will be credited the amount (or value) calculated for the real event (i.e., according to the odds calculated for an actual bet in the live wagering system) also in the form of "play money." Of course, alternatively, a non-monetary system of determining winners (e.g., such as a point system) may be employed, if desired. In one exemplary embodiment, bettors may use any play money accumulated (i.e., won) during wagering to place additional "play money" wagers. In other words, if a bettor has an initial play money bankroll of, for example, $10,000 but has amassed a cumulative total of $14,000 halfway through a series of ten events comprising the contest, he or she may wager (or not wager) the full amount of $14,000 among the remaining five events. In another exemplary embodiment, the bettor may be permitted to wager only from the initial play money bankroll of $10,000, with all contest winnings going into another account associated with that entry and being the sole measure of wagering success so as to stimulate full utilization of the bankroll.

Figure 2:
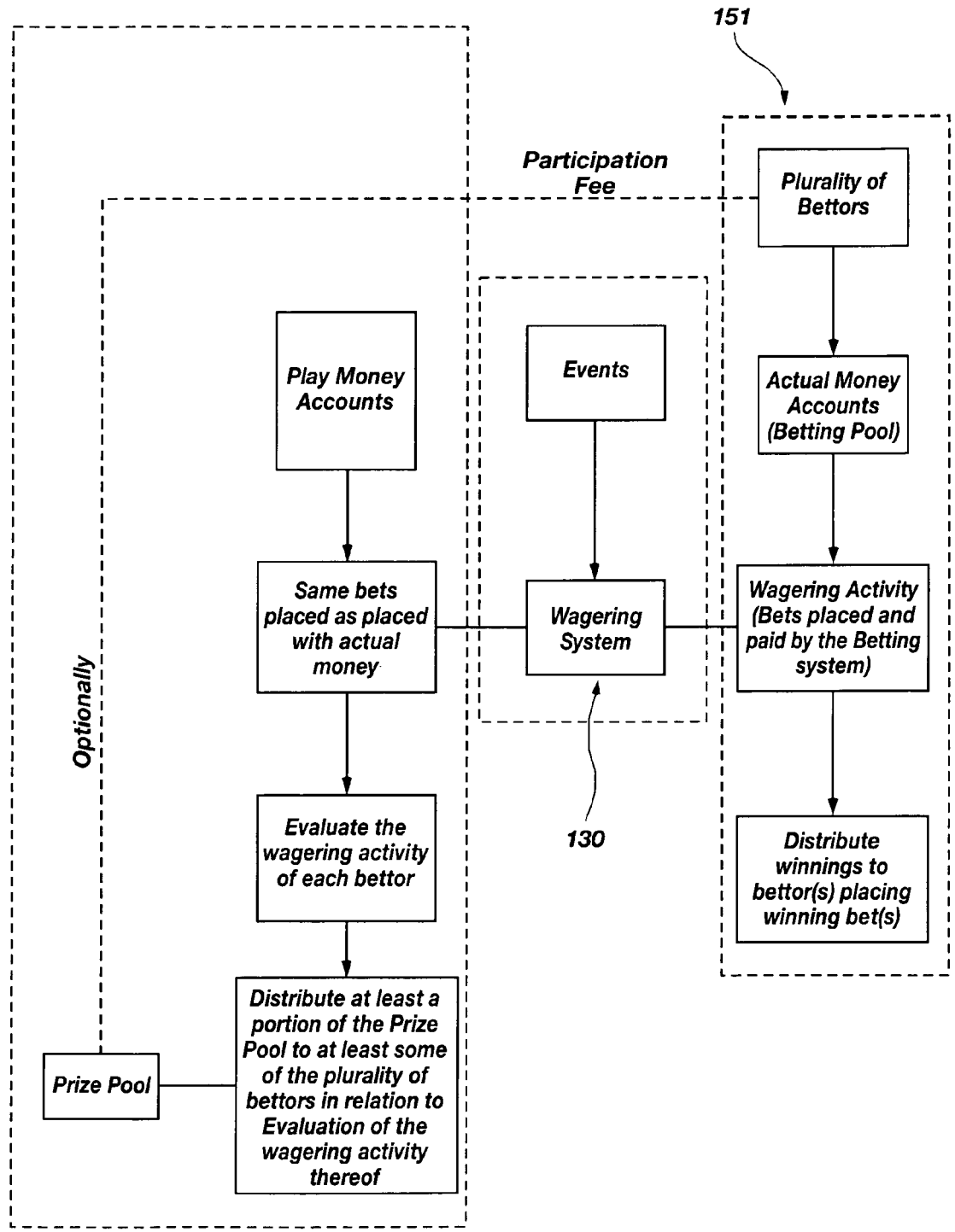
FIG. 2 is a schematic block diagram illustrating another method for conducting wagering activity in accordance with one embodiment of the present invention.

Explaining further, the methods of the present invention may be practiced in a parallel fashion (i.e., simultaneously or concurrently) with conventional live pool wagering activities. In one embodiment of a wagering method 150 of the present invention, bets that are placed with actual money wagering system 130 may be placed separate from bets in the live pool, if any, by a bettor. Alternatively, the present invention also contemplates that, in a wagering method 151 as shown in FIG. 2, when a bettor places conventional bets into a live pool at a race track or other venue via wagering system 130, the same bets may be automatically and substantially concurrently entered into a parallel, competitive pool for those players who elected to participate (or who were automatically entered) in the contest wagering activity.

Alternatively, unlike the above described embodiment in which players purchase a fantasy or play money bankroll from which to place wagers the results of which are used to determine winners, bettors in another variation would instead pay their entry fee at any point in the day and from that point forward, the wagering system (e.g., via computer software) would track their actual wagers. However, in this embodiment, bettors would place real wagers using their own real money. Accordingly, bettors participating in a wagering activity structured according to such an embodiment may not be encouraged to wager until their account balances are depleted. It is contemplated that this embodiment may also function in the absence of participation fees in an arrangement wherein all prize expenses would be borne by the game operator or other sponsor.

Further, in this embodiment, winners may be determined using any of the above-described criteria (e.g., most bets placed, highest winning percentage, etc.). Alternatively, winners could be determined formulaically. For example, one straightforward formula may simply evaluate wagering activity by dividing each participating bettor's total daily winnings (in play money or in real money) by his/her total play money or real dollars wagered to determine the "best wagering performance (or return) of the day" at that location. The distribution of the prize pool, the determination of winners, and the marketing variations may be altered as described above. For example, the game operator may award prizes to a selected number of winners (winner take all, top 5, top 10, etc.). Also, winners may be determined on a per event basis, or with respect to a given time period (e.g., on an hourly, daily, weekly, monthly, etc. basis).

In further detail, wagering activities as described herein may be administered by a wagering system and using terminals as disclosed in U.S. patent application Ser. No. 11/005,810, the disclosure of which application is incorporated in its entirety herein by this reference. In addition, a wagering system such as may also be referred to as "FastBet" or "Enterprise Wagering System" may be employed. Such a system is disclosed in U.S. patent application Ser. No. 10/731,701, the disclosure of which application is incorporated in its entirety herein by this reference. In addition, generally, cashless gaming systems as known in the art may be particularly suitable for use in implementing the present invention, wherein a card may be used for placing and memorializing wagering activity in association with an identified account. For instance, U.S. Pat. No. 5,984,779 to Bridgeman et al., the disclosure of which patent is incorporated in its entirety by reference herein, discloses a gaming method for table games (e.g., blackjack, pai-gow, etc.) and real time electronic gaming (slots, draw poker, keno, bingo) where payment may be accepted using a cashless system such as coupons, credit cards, or debit cards. U.S. Pat. No. 5,265,874 to Dickinson et al., the disclosure of which patent is incorporated by reference herein, discloses a cashless gaming apparatus and method. Another cashless gaming system is disclosed in U.S. Pat. Nos. 6,347,738 and 5,902,983 to Crevelt et al., the disclosure of each of which patents is incorporated by reference herein.

One method sequence may include: 1) Upon logging on to a self-serve terminal, a bettor would be asked if he or she would like to participate in today's contest (YES or NO); 2) If the player responds NO, the bettor simply places wagers as he normally would; 3) If the bettor responds YES, the entry fee will be deducted from his or her card balance and subsequent fantasy or real bet amounts and bet results for the contest period will be monitored and tracked. Of course, optionally, throughout the contest period, bettors may be able to view their performance and the performance of at least some of their competitors (including but not limited to their rank among a selected group). For instance, such information may be supplied to a bettor that is logged on to a self-serve terminal. Alternatively or additionally, such information may also be displayed using other media, such as on a cell phone, or on a wireless-enabled PDA or other hand-held device provided by the operator in a Wi-Fi environment. As a further option, throughout the contest period, players may be able to view (e.g., in real time or otherwise) jackpot information (including but not limited to the gross amount in the prize pool, and the derivative amounts for each prize tier to be awarded) via a self-serve terminal or other communicative mechanism as known in the art. In addition, during the course of the contest the most successful bettors (the top ten, for example) and their standings at a given point in time, such as after each event of the plurality of events, may be displayed on a so-called "leader board" configured as a video monitor, to stimulate greater interest and more active betting in the contest.

Finally, as discussed above, it may be possible to electronically link different tracks to one another for conducting a competition common to all. Such a configuration may create many exciting marketing opportunities including generating larger, more attractive prize pools, jackpots, enabling competition, tournament style wagering, play between different venues, such as, for example, Churchill Downs and Belmont Raceway.

As mentioned above, an evaluation of each of the plurality of bettors may be communicated to each of the plurality of bettors during the contest wagering time period. For example, the cumulative accounting of at least some of the plurality of bettors play money accounts may be displayed or may be otherwise accessible (e.g., via the Internet, a computer network, Wi-Fi, etc.) to other bettors or to other people generally. The performance of at least some of the plurality of bettors may be accessible in real time or as may otherwise be convenient for the wagering administrator. Thus, each bettor may be able to relate and compare his or her wagering activity relevant to the contest to another bettor of the plurality of bettors during the wagering time period. Further, knowing the respective performance of each of the plurality of bettors may allow for strategic considerations to influence the subsequent contest wagering activity of at least some of the plurality of bettors. Such a configuration may provide entertainment and an enhanced sense of competition among the plurality of bettors.

Additionally, as mentioned above, an evaluation (i.e., final or cumulative evaluation) of the outcomes of wagering activity of each of the plurality of bettors may be performed and a prize pool may be distributed according to such an evaluation. In one example, the prize pool may be defined as the cumulative total of participation fees less a take-out amount. Alternatively, prizes, such as items or services of value may be awarded, as selected by a betting administrator. In some instances, the prize pool may be fashioned to exceed the cumulative total of the participation fees in order to support marketing or marketing purposes, or any other purpose deemed suitable by a wagering administrator. As a further alternative, no participation fees may be charged and prizes may be awarded as may be obtained by donation or otherwise procured as, for example, by vendors seeking advertising exposure to their wares and services. Accordingly, as may be appreciated, the prize pool may be allocated according to a percentage of sales (participation fees) but may also be adjusted or altered to include specific prizes in order to provide variety and interest to selected demographic groups of potential bettors. Such a configuration may provide a wagering activity that provides the ability to add attractive marketing features such as, but not limited to, for instance: free or player-paid bonus features such as specific winnings during specified time periods, raffle-based drawings among previous winners or non-winner entrants, bonus awards for players attaining predefined thresholds of winnings, wagers, winning percentages, etc.

In one embodiment for evaluating the wagering activity of each of a plurality of bettors, the object of the competitive wagering activity may be for bettors to win as much "play money" as possible. In this embodiment, participants may be motivated to wager any accumulated winnings and to continue wagering until their "play money" balance is depleted. For example, the contest may be structured so that only play money winnings, and not the initial play money stake, are considered in determining contest winners. Further, the contest may be structured so that any of the original play money stake remaining at the end of the contest is deducted from play money winnings. In a second embodiment, payout or rewards may be provided to the bettor(s) having the highest "play money" balance at end of wagering period. As may be apparent, in such a configuration, bettors may not want to deplete a relatively high "play money" balance near the end of the wagering period for strategic reasons. Instead, they may manage their "play money" budget wisely and may possibly refrain from or limit additional wagers near the end of the wagering period. To counteract this tendency, the rules established by the game operator may require placement of a wager in each (or some given number) of the plurality of events during the competition to avoid disqualification. In a third embodiment, in which participants may wager real money into live pools (the results of which are tracked via use of player loyalty or account wagering cards), payouts or rewards may be provided to the bettor(s) having the highest return on the wagering dollar as formulaically calculated. Of course, there are many alternative arrangements for how the bettors accumulating the most play money during the betting period may be rewarded. Generally, a selected at least one bettor that accumulates the most play money during the betting period may be awarded a portion of a prize pool. On the other hand, a bettor that accumulates the least play money during the betting period may be awarded a (lesser) portion of a prize pool as a consolation prize.

Figure 3A:
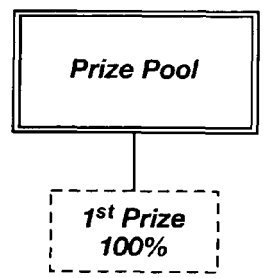
FIG. 3A is a diagram showing one exemplary prize structure in accordance with one embodiment of the present invention.
Figure 3B:
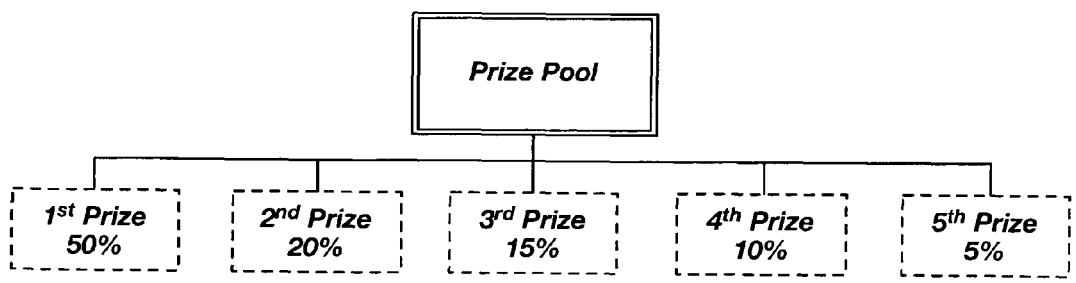
FIG. 3B is a diagram, showing another exemplary, tiered prize structure in accordance with another embodiment of the present invention.

Generally, a payout or winning condition of any competitive wagering game may be selected according to any number of criteria. In one example, as shown in FIG. 3A, a bettor with the highest winnings could be awarded 100% of the prize pool. Alternatively, as shown in FIG. 3B, percentages of the prize pool could be dedicated to the five bettors accumulating the most play money value (e.g., 1$^{st}$ place=50% of the prize pool, 2$^{nd}$ place=20% of the prize pool, 3$^{rd}$ place=15% of the prize pool, 4$^{th}$ place=10% of the prize pool and 5$^{th}$ place=5% of the prize pool). Of course, the prize pool may be distributed in many various ways, including but not limited to paying a portion thereof to a bettor based upon at least one of: 1) placing the greatest number of wagers placed during the wagering period; 2) placing the greatest number of winning wagers; 3) placing the highest percentage of winning wagers; 4) obtaining the largest single win during the wagering period. As may be appreciated, combinations of the above-mentioned exemplary schemes may be employed. Thus, the present invention may provide a wagering activity in which the criterion for winning at least a portion of the prize pool is variable, selectable, and easily modified. It is noted that the prize structure configurations described herein as depicted in FIGS. 3A and 3B are exemplary and not limiting of the present invention and that implementation of any given prize structure would be in accordance with the present invention.

In another aspect of the present invention, the contest wagering activities may be extended to any event having a determinable, but at least somewhat unpredictable, outcome. Stated another way, aspects of the present invention may be employed for administration of wagering activities based upon at least one outcome of any game of chance or any skill-based game. For example, a plurality of bettors may compete by placing wagers upon the outcome of other wagering events, such as slot machine games and video lottery games (poker, keno, blackjack, etc.). In one specific, nonlimiting example, if a venue wanted to run a contest wagering activity of the present invention based on casino gaming such as a craps game, a live video feed may be run from a craps table at a casino where real money wagering is taking place. Contest participants may participate through the Internet, viewing the live craps game and wagering using fantasy dollars. The outcomes of the wagers would be determined by the action at the real craps table. Thus, the fantasy wagering iteration is based upon, and parallel to, the real wagering and all participants are wagering on common live events. This is in marked contrast to, for example, a slot machine contest wherein each entrant plays a separate machine.

The present invention may also be employed for wagering competitions based on the outcome of play of well-known and established games such as desktop solitaire or a board game such as, for instance, a MONOPOLY® game.

While many such applications for the present invention may be illegal under current United States gaming laws, such United States laws may change and other countries may allow such applications now or in the future. Alternatively, methods according to the present invention may be employed in a non-wagering context by eliminating at least one of the wager and the prize, or both.

Thus, the present invention may provide a wagering game in which a participation fee makes players eligible for significant cash or merchandise prizes and that provides an extended gaming experience providing considerable value per entertainment dollar. Such economy may essentially enable participants to lose money at a slower rate while obtaining enhanced amusement or entertainment value. In addition, such a wagering activity may be structured to support "individual versus individual" competition, as well as competition among teams or groups formed on an ad hoc basis in betting locations and in real-time, wherein participants can track their own performance and compare it to the performances of competing players or teams. Moreover, the present invention may provide a wagering activity that is based upon cumulative results rather than the results of a singular event or a series of independent events and that accurately simulates (does not corrupt the integrity of) the underlying events. Such an arrangement may attract new players to the venues hosting the featured event(s) and rekindle the interest of occasional, infrequent and lapsed players. Additionally, as mentioned above, such a wagering activity may be readily capable of being played by individuals, teams, or both.

It may also be appreciated that the present invention may be implemented to provide a wagering activity that may link players from around the country or around the world in a common competition for cash or merchandise prizes. Such a wagering activity may control or limit bettor expenditures and control operator exposure while allowing players to authentically play the featured game (horseracing, slots, blackjack, etc.). Accordingly, such a wagering arrangement may reduce the likelihood of problem gaming.

Variables, such as the take-out, jackpot allocation, number of total events (e.g., races), number of selections allowed, average field size, win criteria (e.g., win, place, show), number of tiers and other variables may be altered and different prize structures may be utilized. Using such variables, one of ordinary skill in the art may compute the various odds of winning a specified wagering event and provide a corresponding prize structure. It is further noted that the above exemplary embodiments readily provide scalability. Thus, the present method may be tailored to individual venues depending, for example, on the number of patrons attending a given event and the expected level of participation by the patrons in the wagering activity.

It is noted that the competitive wagering activity of the present invention exhibits the ability to be conducted over an extended period of time. Thus, based on the above-stated assumptions, the prize structure may set forth anticipated prize payouts (or liability of an establishment) over a significant period of time, while also mathematically predicting the anticipated exposure of an establishment during a specified cycle of activity such as, for example, a year, a week, or some other specified time period or cycle. The ability to make such long-term forecasts while also determining more immediate exposure provides a significant tool for an establishment that is conducting or facilitating such competitive wagering events. In such an instance, the prizes may be structured as a series of tiers, the highest tier comprising the greatest prize or groups of prizes with the greatest degree of difficulty to win, and in which a winner in a subset of all the periods or even within all of the periods is not necessarily guaranteed. In such an instance, a threshold amount of winnings may be required, the first one (or several) to reach this threshold winning or sharing the prize. For example, a prize structure may show, based upon probabilities, that the anticipated number of winners of a Tier 1 jackpot or prize for a given week is 0.02 or, assuming fifty events are conducted in a year, one winner is expected per year at this level.

Furthermore, such a method enables the administrator to offer a greater number of tiered jackpots for added enticement of wagering by the patrons. The following discussion and examples provided will be useful in amplifying the potential for engineering prize structures for those of ordinary skill in the art.

In one embodiment, players will pay an entry fee to participate in a handicapping contest in accordance with the present invention. For example, if 500 players each paid $20, entry fees would total $10,000. The game operator would deduct a defined percentage (called the "take-out") from this amount to cover operation expenses. Continuing the example, after deducting 20% for take-out (a rate typical of the thoroughbred racing industry), $8,000 would remain to be awarded as prizes to players. This is the contest prize pool.

In its simplest form, winning could be defined as the individual who wins the greatest amount [of play money] from his/her wagers during the contest period. This example would result in a winner-take-all situation, and the winner would receive $8,000. A weakness of this approach would be that the other 499 entrants suffer losing experiences. Over time, such a high incidence of losing will detract from the entertainment value of this activity and will discourage continued play. As play decreases, so will the size of subsequent jackpots, thereby making the wagering contest progressively less attractive.

It should be noted that the foregoing problem is common in the lottery gaming environment, especially with regard to in-state jackpot games. As lotto game sales erode, jackpot growth is retarded and jackpot winners occur less frequently. Players perceive the game as "broken" and it is nearly impossible to reverse or correct this negative cycle. Generally, the affected lotto game will have to be replaced with an entirely new game or reengineered to add new marketing features, bonuses, etc.

To avoid this type of problem, contest prizes in accordance with the present invention may be dynamically generated to provide the ability to adapt to changing market conditions and the flexibility required to keep the contest fresh, unique and entertaining. The game operator has the capability to identify criteria that define winning experiences (as previously discussed, winning could be defined as most money won, most winning wagers, etc.). The types of winning experiences may be categorized to fall into one of four broad categories: Top-Tier Prizes, Consolation Prizes, Rolling Jackpot Prizes, and/or Raffle Drawing Prizes.

Top-Tier Prizes will be the top "n" money winners of the contest, where "n" is a variable number selected by the game operator, or other sponsor. The game operator may award prizes to the top three winners, the top 25 winners, etc. It is likely that in most cases the number of top winners will be fairly small (e.g., 10) so that prize amounts are not diluted.

Consolation prizes will enhance the overall odds of winning a cash prize so that players perceive that they have a reasonable chance of winning something. The number of consolation prizes will be configurable to produce the desired win frequency. For example, if the game operator desires 20% of the entrants to win consolation prizes, the contest would be configured so that number of consolation prizes would increase proportionately to the number of participants entering the contest; i.e., the system would automatically add a consolation prize for every fifth entrant. In this fashion, the number of consolation prizes will be dynamically determined by the number of entrants while size of the consolation prizes will be determined by the percentage of the prize pool dedicated to that category of winners.

Situations will occur in which an insufficient number of entrants will satisfy the criteria that define winning. For example, based upon the number of entrants, the system may dictate a total of 50 consolation prizes. However, in reality there may be only 40 entrants who had winning experiences. In these situations, only 40 consolation prizes would, in fact, be awarded. The prize money initially set to be allocated to the remaining 10 entrants, who did not qualify as winners, would be pari-mutuelly distributed equally among the 40 qualified winners. Alternative methods for distributing this money to other prize categories (such as the jackpot) are also contemplated.

A percentage of the prize pool can be allocated to fund larger, longer-term performance based prizes, termed Rolling Jackpot prizes. For example, the game operator could allocate 5% of each individual contest prize pool to accrue and be awarded to the individual with the best performance of the week, month, quarter, etc. The magnitude of these prizes will generate continued interest and encourage repeat play.

In implementing a Raffle Drawing Prize feature, a percentage of the prize pool can be allocated to a raffle in which winners are selected from among the group of players who failed to win other prizes. The selection of these winners could occur randomly or formulas could be constructed to define the "worst" performance(s) of the day, week, month, etc. For example, the individual who throughout the day (or other selected period or number of events) falls the greatest number of positions in the participant standings might receive a prize. These prizes would be few in number, as they are not consistent with, nor are they the primary focus of, a skill based performance contest. Equivalent to door prizes, they would provide some entertainment value and some small hope for individuals who experienced poor performances.

In one contemplated implementation of a tiered wagering activity according to the present invention, the game operator may allocate a percentage of the prize pool to each win category and retain the discretion to utilize the four prize categories separately or in conjunction with each other. For example, the operator may elect to not use the Rolling Jackpot or Raffle Drawing Prize categories. Regardless of how many win categories are employed, 100% of the prize pool will be allocated to winners (as that term is defined by the game operator). Moreover, the present invention provides a means to perceptibly equalize the differences between skilled and novice bettors with regard to handicapping the selection of runners without discouraging more experienced bettors. For example, if a given bettor does not have adequate resources (experience, time, access to past performances, etc.) to skillfully handicap all of the races of a given contest wagering activity, he or she can focus on a single race or on a subset of runners or place wagers, which more experienced bettors would normally forego but, which nonetheless might result in winning outcomes. This allows the novice bettor to participate without being at a disadvantage relative to those who have superior handicapping skills or access to the resources necessary for effectively handicapping, while not reducing the perceived advantage of the skilled handicapper. This aspect of the contest wagering activity of the present invention may put novices and experts on a more equal playing level, primarily because one can bet with play money on long shots and win the contest prize. Thus, in the contest wagering activity of the present invention, skills of the individual may enhance the experience of the wagering, first because (unlike, for example, slot machines or lottery gaming) handicapping employs some skill on the part of the individual and second, the competitive or contest format of the present invention pits one's skill against those of other participants. However, the use of fantasy dollars or play money in selected embodiments enables and may incentivize the betting on long shots, thus giving less experienced bettors a perception of enhanced potential for obtaining a favorable result over the course of the plurality of events.

Figure 4:
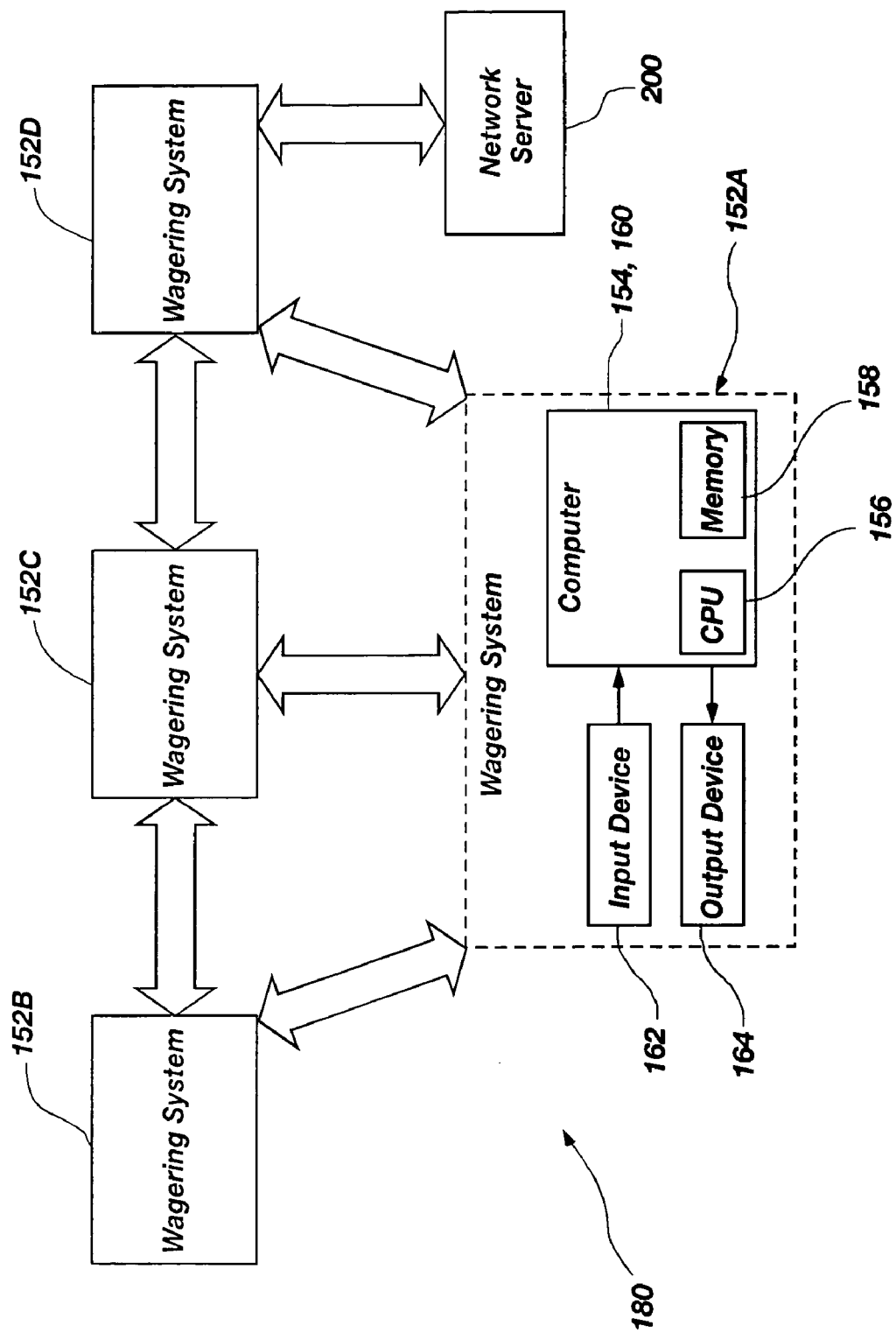
FIG. 4 is a schematic of a wagering system and network, which may be used in accordance with an aspect of the present invention.

In another aspect of the present invention, referring now to FIG. 4, a network 180 for conducting a wagering activity, such as, for instance, pari-mutuel wagering may include a plurality of wagering systems 152A-152D, which are operably coupled to one another. Each system may include, for example, a computer 154 with a central processing unit (CPU) 156 or other processing device and associated memory 158. Each computer 154 may be configured to act as a random number generator 160 for random selection of one or more predicted aspects of an outcome of an event. An input device 162 may be coupled with the computer 154 for bettor input regarding another predicted aspect of an outcome of an event. The input device 162 may further include a device for accepting a monetary value associated with a wager wherein the device may include, for example, a coin collector, a bill collector or a card reader. An output device 164 may also be coupled with the computer 154 and configured, for example, to display the resulting combination of the bettor-selected prediction and randomly selected prediction, which forms a wager. Such an output device 164 may include, for example, a visual display and or a printing device. Additionally, such an output device 164 may be configured to display the results of an event taking place at a remote venue. Thus, for example, a first wagering system 152A may be located at a first venue, while another wagering system 152D may be located at a second remotely located venue. Thus, the network 180 formed of the plurality of wagering systems 152A-152D may enable wagering on, and monitoring of, events at multiple venues substantially simultaneously if so desired. In another embodiment, the wagering systems 152A-152D may be located in a single venue where, for example, a first wagering system 152A acts as a server for all of the wagering systems networked to it for conduct of the contest wagering activity of the present invention while other wagering systems 152B-152D act as terminals coupled with the server. In yet another alternative, wagering systems 152A-D may be networked to a dedicated network server 200 for administering the contest wagering activity of the present invention so as to input data thereto in the form of sums wagered and the bets placed and receive data therefrom in the form of outcomes and winnings.

It may be appreciated that a wagering activity according to the present invention may be effected in a specific environment at a specific location on a stand-alone (or closed) system or may be electronically linked to include play in a plurality of environments or at a plurality of locations. For example, a wagering activity may be distributed through a variety of wagering venues including race tracks, off-track betting facilities, retail establishments (where legal), casinos, lotteries, and on the Internet. Further, such wagering activity and evaluation thereof may provide automatic and immediate performance feedback (individual and team performance, leader boards or other indicia of participant standings, contest time remaining, account balances, etc.) to participants via text messaging, cellular telephones, PDAs, interactive television, email, Internet browsers or other applications, etc.

In sum, the present invention contemplates methods and systems of conducting wagers, such as pari-mutuel wagers. In one exemplary embodiment a plurality of events, such as horse races, dog races, other events, etc., are identified for which a plurality of bettors may each competitively place at least one wager. Each bettor of the plurality is enabled to provide input regarding at least one portion of their respective at least one wager prior to the event. The cumulative wagering activity of each of the bettors is tracked, and may occur substantially simultaneously with an actual or live betting pool or system.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A method of conducting a competitive wagering activity, comprising:
   providing a plurality of events upon which a plurality of bettors may each place at least one wager over a wagering system;
   enabling each bettor of the plurality of bettors to engage in at least one live pool wagering activity in relation to at least one of the plurality of events with an input device coupled to the wagering system;
   enabling each bettor of the plurality of bettors to engage in a competitive wagering activity in relation to at least one of the plurality of events with the input device coupled to the wagering system, an amount of the competitive wagering activity for each bettor of the plurality being proportional to an amount of each bettor's at least one live pool wagering activity, wherein the at least one live pool wagering activity is in parallel with and through the wagering system for the competitive wagering activity, and wherein an accounting for wagers and outcomes of the live pool wagering activity is separate from an accounting for wagers and outcomes of the competitive wagering activity; and
   evaluating cumulative competitive wagering activity engaged in the competitive wagering activity of each of the plurality of bettors for all of the plurality of events.

2. The method according to claim 1, wherein enabling each bettor of the plurality of bettors to engage in the competitive wagering activity in relation to at least one of the plurality of events comprises providing each bettor with an amount of play money or the like for engaging in the competitive wagering activity in relation to at least one of the plurality of events.

3. The method according to claim 2, further comprising allowing each of the plurality of bettors to participate in the competitive wagering activity responsive to collecting at least one participation fee from each bettor of the plurality of bettors.

4. The method according to claim 3, further comprising selecting the amount of play money for engaging in the competitive wagering activity to exceed the amount of each of the at least one participation fee.

5. The method according to claim 2, wherein enabling each bettor of the plurality of bettors to engage in the competitive wagering activity in relation to at least one of the plurality of events comprises enabling each bettor of the plurality of bettors to engage in pari-mutuel wagering activity in relation to a plurality of races.

6. The method according to claim 2, wherein evaluating cumulative competitive wagering activity of each of the plurality of bettors comprises determining the bettor of the plurality of bettors having a greatest amount of play money subsequent to a conclusion of the plurality of events.

7. The method according to claim 1, wherein providing a plurality of events upon which a plurality of bettors may each place a wager over a wagering system includes conducting a plurality of races wherein each race of the plurality of races includes a plurality of runners.

8. The method according to claim 7, wherein enabling each bettor of the plurality of bettors to engage in a competitive wagering activity in relation to at least one of the plurality of races includes enabling each bettor to select at least one runner of at least one race of the plurality of races using the input device coupled to the wagering system.

9. The method according to claim 8, wherein selecting at least one runner of at least one race further includes selecting a finishing order of the at least one racer of the at least one race of the plurality of races.

10. The method according to claim 1, further comprising determining a prize pool to be distributed according to the evaluation of the cumulative competitive wagering activity of each of the plurality of bettors.

11. The method according to claim 10, further comprising distributing the prize pool to at least one of the plurality of bettors according to at least a first prize having a first value and at least a second prize having a second value different from the first value.

12. The method according to claim 11, wherein distributing the prize pool comprises distributing the prize pool as follows: bettor having greatest play money winnings=50% of the prize pool, bettor having second greatest play money winnings=20% of the prize pool, bettor having third greatest play money winnings=15% of the prize pool, bettor having fourth greatest play money winnings=10% of the prize pool, and bettor having fifth greatest play money winnings=5% of the prize pool.

13. The method according to claim 10, wherein distributing the prize pool comprises distributing the entire prize pool to the bettor having the highest winnings with respect to wagered play money.

14. The method according to claim 1, wherein evaluating cumulative competitive wagering activity of each of the plurality of bettors comprises evaluating at least one of: placing the greatest number of wagers placed during the wagering period; placing the greatest number of winning wagers; placing the highest percentage of winning wagers; obtaining a largest single win during the wagering period.

15. The method according to claim 1, further comprising allowing each of the plurality of bettors to participate in the competitive wagering activity responsive to collecting at least one participation fee from each bettor of the plurality of bettors.

16. The method according to claim 15, further comprising determining a prize pool by removing a selected percentage of the cumulative sum of the at least one participation fee of each of the plurality of bettors.

17. The method according to claim 16, further comprising distributing the prize pool to at least one of the plurality of bettors according to at least a first prize having a first value and at least a second prize having a second value different from the first value.

18. The method according to claim 1, further comprising communicating a substantially real time evaluation of the wagering activity of at least some of the plurality of bettors during at least some of the plurality of events.

19. The method according to claim 18, wherein communicating the substantially real time evaluation comprises communicating the substantially real time evaluation via a network of wagering systems.

20. The method according to claim 1, further comprising determining a prize pool to be distributed according to the evaluation of the cumulative competitive wagering activity, wherein the evaluation is based upon the live pool wagering activity of each of the plurality of bettors engaged in the competitive wagering activity;
wherein distributing the prize pool comprises distributing at least a portion of the prize pool to the bettor having the greatest return on real money wagered in the live pool wagering activity.

21. The method according to claim 1, further comprising selecting at least two of the plurality of events to occur in different venues.

22. A method of conducting a competitive wagering activity, the method comprising:
requiring each bettor of a plurality of bettors to pay a participation fee using an input device coupled to a wagering system for a competitive wagering activity conducted over the wagering system including the plurality of bettors in which an outcome thereof is determined with respect to a cumulative evaluation of wagering activities related to a plurality of events;
enabling each bettor of the plurality of bettors to place a real money bet for each event of the plurality of events; and
enabling each bettor of the plurality of bettors to place a play money bet for each event of the plurality of events for engaging in the competitive wagering activity wherein the amount of play money for each play money bet therein is an amount proportional to the real money bet placed by each of the plurality of bettors for each event of the plurality of events, wherein an accounting for amounts and outcomes of the real money bet for each event of the plurality of events is separate from an accounting for amounts and outcomes of the competitive wagering activity.

23. The method according to claim 22, further comprising automatically wagering an amount of play money for engaging in the competitive wagering when each bettor places a real money bet for each event of the plurality of events.

24. The method according to claim 22, further comprising selecting the amount of play money for engaging in the competitive wagering activity to exceed the amount of the participation fee.

25. The method according to claim 24, wherein cumulative evaluation of the competitive wagering activities of each of the plurality of bettors comprises determining the bettor of the plurality of bettors having a greatest amount of play money subsequent to a conclusion of the plurality of events.

26. The method according to claim 22, further comprising selecting the competitive wagering activity to comprise pari-mutuel wagering activity.

27. The method according to claim 26, further comprising selecting the plurality of events to comprise a plurality of races each having a plurality of runners.

28. The method according to claim 26, further comprising wagering with respect to selecting at least one runner of at least one race of the plurality of races or selecting a finishing order of the at least one runner of the at least one race of the plurality of races.

29. The method according to claim 22, further comprising distributing a prize pool to at least one of the plurality of bettors according to the cumulative evaluation of the wagering activities of each of the plurality of bettors.

30. The method according to claim 29, further comprising distributing the prize pool to at least one of the plurality of bettors according to at least a first prize having a first value and at least a second prize having a second value different from the first value.

31. The method according to claim 29, wherein distributing the prize pool comprises distributing the entire prize pool to the bettor having the highest winnings with respect to wagered play money.

32. The method according to claim 29, wherein distributing the prize pool comprises distributing the prize pool as follows: bettor having greatest play money winnings=50% of the prize pool, bettor having second greatest play money winnings=20% of the prize pool, bettor having third greatest play money winnings=15% of the prize pool, bettor having fourth greatest play money winnings=10% of the prize pool, and bettor having fifth greatest play money winnings=5% of the prize pool.

33. The method according to claim 29, further comprising determining the prize pool by removing a selected percentage of the cumulative sum of the at least one participation fee of each of the plurality of bettors.

34. The method according to claim 22, wherein enabling each bettor of the plurality of bettors to place a play money bet for each event of the plurality of events for engaging in the competitive wagering activity comprises automatically wagering an amount of play money for engaging in the competitive wagering activity equal to a real money bet made by each of the plurality of bettors for each event of the plurality of events.

35. The method according to claim 22, wherein the cumulative evaluation of the wagering activities of each of the plurality of bettors comprises an evaluation of at least one of: placing the greatest number of wagers placed during the wagering period; placing the greatest number of winning wagers; placing the highest percentage of winning wagers; obtaining a largest single win during the wagering period.

36. The method according to claim 22, further comprising interpreting a substantially real time evaluation of the wagering activity for at least some of the plurality of bettors during at least one of the plurality of events.

37. The method according to claim 22, wherein at least two of the plurality of events occur in different venues.

38. A wagering system, comprising:
a computing system including at least one input device, at least one display device, at least one processor, and at least one memory device which stores a plurality of instructions, which when executed by the at least one processor causes the at least one processor to operate with the at least one display device and the at least one input device to:
provide a plurality of events upon which a plurality of bettors may each place at least one wager with the at least one input device coupled to the computing system;
enable each bettor of the plurality of bettors to engage in a competitive wagering activity in relation to the plurality of events while concurrently enabling any of the plurality of bettors to engage in a live pool wagering activity based upon an outcome of one of the plurality of events, wherein an amount of the competitive wagering activity is proportional to an amount of the live pool wagering activity; and
conduct an accounting for wagers and outcomes of the live pool wagering activity separate from an accounting for wagers and outcomes of the competitive wagering activity.

39. The wagering system of claim 38, wherein the computing system is programmed to evaluate cumulative competitive wagering activity of each of the plurality of bettors for all of the plurality of events.

40. The wagering system of claim 38, wherein the computing system is programmed to automatically enter bettors using an identification instrument in conjunction with the live pool wagering activity in the competitive wagering activity.

41. The wagering system of claim 38, wherein the computing system is programmed to require an entry fee to enable a bettor to engage in the competitive wagering activity.

42. The wagering system of claim 39, wherein the cumulative wagering activity of each of the plurality of the bettors is the cumulative live pool wagering activity of each bettor.

* * * * *

UNITED STATES PATENT AND TRADEMARK OFFICE
CERTIFICATE OF CORRECTION

| | |
|---|---|
| PATENT NO. | : 7,942,735 B2 |
| APPLICATION NO. | : 11/079923 |
| DATED | : May 17, 2011 |
| INVENTOR(S) | : Mark G. Meyer and Joseph J. Tracy |

It is certified that error appears in the above-identified patent and that said Letters Patent is hereby corrected as shown below:

In the claims:

CLAIM 42, COLUMN 22, LINE 32, change "of the bettors" to --of bettors--

Signed and Sealed this
Thirteenth Day of August, 2013

Teresa Stanek Rea
*Acting Director of the United States Patent and Trademark Office*